(12) United States Patent
Choi

(10) Patent No.: US 7,080,637 B2
(45) Date of Patent: Jul. 25, 2006

(54) CRANKCASE HAVING BLOW-BY GAS PASSAGE AND OIL DRAIN PASSAGE

(75) Inventor: Seung Woo Choi, Yongin (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/885,172

(22) Filed: Jul. 6, 2004

(65) Prior Publication Data

US 2005/0092310 A1    May 5, 2005

(30) Foreign Application Priority Data

Nov. 4, 2003    (KR) .................. 10-2003-0077685

(51) Int. Cl.
*F01M 11/02* (2006.01)
(52) U.S. Cl. ........................................... 123/572
(58) Field of Classification Search ........ 123/572–574, 123/41.86
See application file for complete search history.

(56) References Cited

U.S. PATENT DOCUMENTS 5,706,769 A * 1/1998 Shimizu .................. 123/90.23
6,405,721 B1 * 6/2002 Moren ..................... 123/572
6,431,157 B1 * 8/2002 Marcil .................. 123/568.11
6,439,215 B1 * 8/2002 Sato et al. ................ 123/572
6,584,964 B1 * 7/2003 Seilenbinder et al. ...... 123/572
6,598,595 B1 * 7/2003 Yasui ....................... 123/572
6,827,068 B1 * 12/2004 Sakata et al. ............. 123/572
6,834,643 B1 * 12/2004 Hori et al. ................ 123/572
6,854,454 B1 * 2/2005 Obayashi et al. ......... 123/572

FOREIGN PATENT DOCUMENTS

JP    11-200829    7/1999

* cited by examiner

*Primary Examiner*—Marguerite McMahon
(74) *Attorney, Agent, or Firm*—Morgan Lewis & Bockius LLP

(57) ABSTRACT

The crankcase of an internal combustion engine includes a blow-by gas passage that is formed inside the crankcase and discharges blow-by gas inside the crankcase to the top of the crankcase. An oil drain passage is also formed inside the crankcase such that it discharges oil collected from the top of the crankcase into the crankcase, whereas the blow-by gas passage and the oil drain passage are interconnected with each other inside the crankcase.

4 Claims, 2 Drawing Sheets

CRANKCASE HAVING BLOW-BY GAS PASSAGE AND OIL DRAIN PASSAGE

CROSS-REFERENCE TO RELATED APPLICATIONS

This application claims priority of Korean Application No. 10-2003-0077685, filed Nov. 4, 2003, the disclosure of which is incorporated herein by reference.

TECHNICAL FIELD OF THE INVENTION

The present invention relates to a crankcase for an engine of a motor vehicle. More specifically, the crankcase includes a blow-by gas passage and oil drain passage.

BACKGROUND OF THE INVENTION

Generally, blow-by gas is gas that leaks through a gap between a piston and a cylinder and flows into a crankcase. Blow-by gas contains non-combusted gas, combusted gas, and oil vapor. If blow-by gas remains inside a crankcase, pressure inside the crankcase increases. The increased pressure applies resistance to movement of the pistons and corrosion is likely to occur within the engine.

Therefore, to reduce blow-by gas from gathering within a crankcase, a technique for releasing blow-by gas is to recycle the blow-by gas and supply it to an intake device. A specific method of accomplishing this goal is to provide an oil drain hole and/or a blow-by hole on a crankcase to exhaust the blow-by gas to a cylinder head cover.

However, the blow-by gas recycle system does not smoothly pass the blow-by gas inside the crankcase to the cylinder head cover. Therefore, the pressure within the crankcase is maintained as a positive pressure. As a result, the reciprocating motion of the piston is interfered with so output is lowered. Furthermore, the force that pushes oil into the crankcase is exceeded by and oil leaks develop. Additionally, the oil contained in blow-by gas is supplied to a combustion chamber with the blow-by gas, thereby, increasing oil consumption and emitting harmful exhaust gas. Furthermore, carbon deposits increase within the engine and result in a lowering of the combustion efficiency.

SUMMARY OF THE INVENTION

According to a preferred embodiment the present invention provides a crankcase which effectively discharges blow-by gas that has accumulated within from a cylinder combustion chamber. Oil consumption is reduced by separating oil contained in blow-by gas and recycling it to the crankcase. Also, the generation of harmful exhaust gasses are reduced by improving the manner in which blow-by gasses are supplied to the combustion chamber.

Preferably, the crankcase of an internal combustion engine includes a blow-by gas passage that is formed inside the crankcase. The blow-by gas passage discharges blow-by gas inside the crankcase and to the top of the crankcase. An oil drain passage is formed inside the crankcase that discharges the oil collected from the top of a crankcase into the crankcase. The blow-by gas passage and the oil drain passage are interconnected with each other inside the crankcase.

Preferably, an expansion chamber is formed between the blow-by gas passage and the oil drain passage, the two passages being interconnection. The blow-by gas passage is formed so as to pass through a certain section of the expansion chamber. The oil drain passage is formed so as to pass by the end of the expansion chamber that is located in the flow direction of the blow-by gas. Preferably, the expansion chamber is formed so as to establish a downward slope in the flow direction of the blow-by gas.

According to a preferred embodiment, the internal combustion engine is a V-type engine that includes multiple cylinders and the blow-by gas passage and the oil drain passage are formed on one side of a cylinder bank of the V-type engine.

It is also preferable that the blow-by gas passage is formed further inside of a crankcase than the oil drain passage and the expansion chamber is extended almost perpendicularly to the cylinder axis of the cylinder bank.

BRIEF DESCRIPTION OF THE DRAWINGS

For better understanding of the nature and objects of the invention, reference should be made to the following detailed description, taken in conjunction with the accompanying drawings, in which.

DETAILED DESCRIPTION OF PREFERRED EMBODIMENTS

Figure 1:
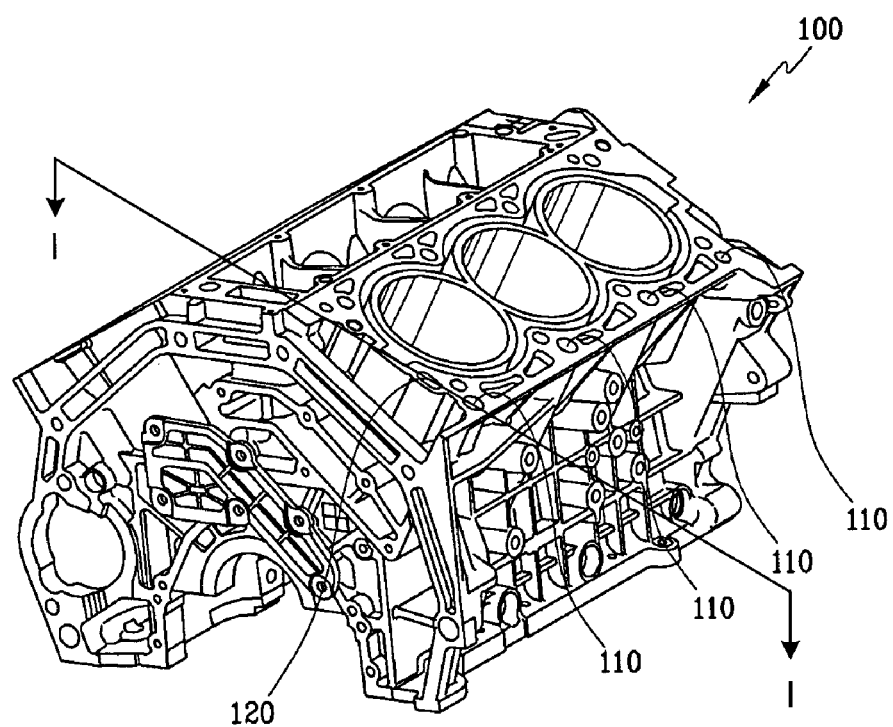
FIG. 1 is an perspective view of the crankcase according to an embodiment of this invention.

According to FIG. 1, a crankcase 100 is illustrated showing generally oil drain passages 110 and a blow-by gas passage 120. Like a typical V-type engine, intake and exhaust systems are combined at the top of the crankcase 100, and an oil pan is combined at the bottom of the crankcase 100. Shown are a plurality of oil drain passages 110 formed at the top face of the crankcase 100. The oil drain passages 110 interconnect with the bottom face of a crankcase 100.

The oil drain passage 110 is the passage through which lubricating oil that has completed lubricating actions is returned to an oil pan combined with the bottom of the crankcase 100. The returned oil flows into the top face of the crankcase 100 and then flows out of the bottom face. In addition, a blow-by gas passage 120 is formed on the top face of the crankcase 100 and interconnects with the bottom face of the crankcase 100.

The blow-by gas passage 120 is the passage used to recycle blow-by gas generated inside the crankcase 100 during engine operation. The blow-by gas is represented to an intake system that is mounted on the top face of the crankcase 100. The blow-by gas is allowed to flow, first, into the bottom face of the crankcase 100 and then be discharged to the top face.

Figure 2:
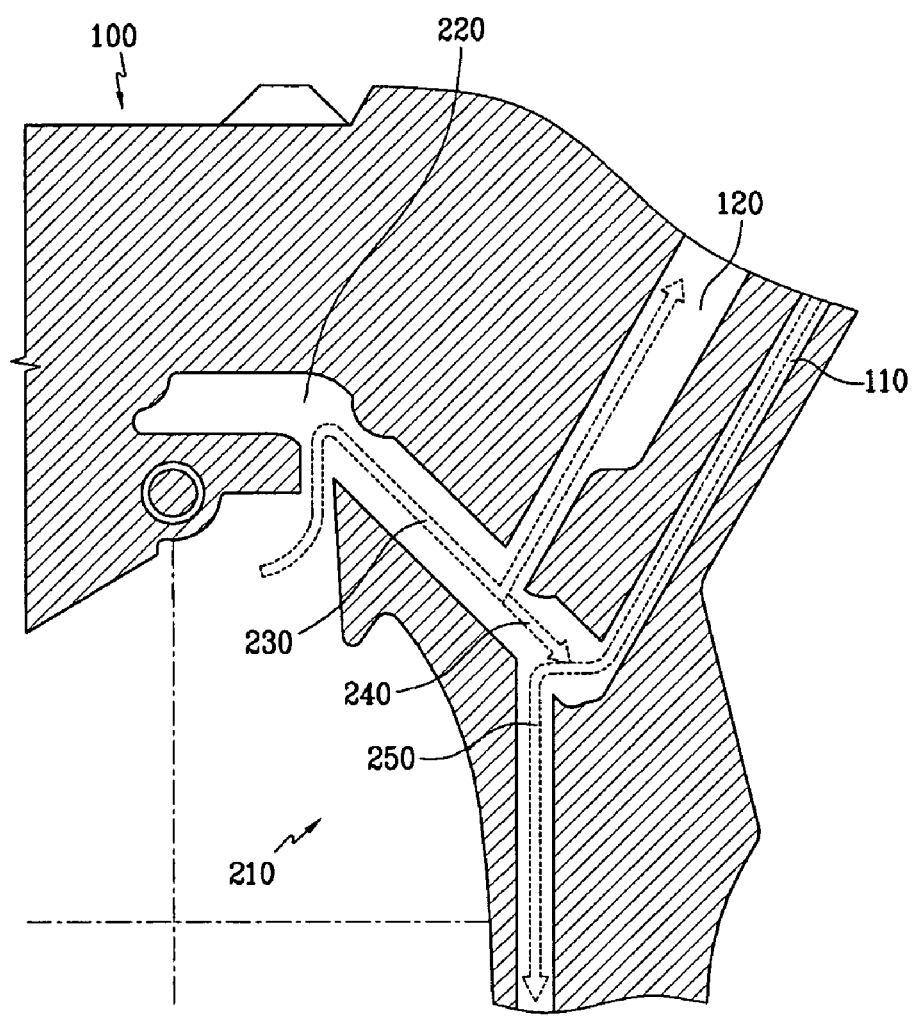
FIG. 2 is a sectional view of the crankcase in FIG. 1 taken along line I—I.

Shown in FIG. 2, are the oil drain passage 110 and the blow-by gas passage 120 that, respectively, pass through the top face and bottom face of the crankcase 100. An expansion chamber 220 is formed between the oil drain passage 110 and the blow-by gas passage 120 for interconnection. The oil 250, recycled from the top face of the crankcase 100 is discharged to the bottom face of the crankcase 100 through the oil drain passage 110. The blow-by gas 230 flown from a combustion chamber into an internal space 210 of the crankcase 100 is allowed to go from the bottom face of the crankcase 100, pass through an expansion chamber 220, and be discharged into the top face of the crankcase 100 via a blow-by gas passage 120. A downward directed lip may be formed at the entrance to expansion chamber 220.

In a V-type engine as illustrated in the Figures, the oil drain passage 110 and blow-by gas passage 120, and the expansion chamber 220 are formed at one side of the cylinder bank of the crankcase 100. The expansion chamber 220 is a space formed inside the crankcase 100 and formed so that its sectional area may be larger than inlet and outlet of the oil drain passage 110 and blow-by gas passage 120.

Preferably, the blow-by gas passage 120 is formed further inside of the crankcase 100 than the oil drain passage 110, and the expansion chamber (220) is extended approximately perpendicular to the cylinder axis of the cylinder bank. The oil drain passage 110 is formed to pass by the left end of the expansion chamber 220, and the blow-by gas 230 is allowed to flow into the left end of the expansion chamber 220. The blow-by gas 230 then flows through a certain section in the direction of left end before it is discharged into the top face of the crankcase 100.

The blow-by gas 230 flowing from the bottom face of the crankcase 100 contains non-combusted gas, combusted gas, and oil vapor 240 that has been vaporized by the high heat of the engine. The oil vapor 240, of the blow-by gas, that has been liquefied from flowing through a section of the expansion chamber 220 is allowed to flow into the outer end of the expansion chamber 220 along the inclined surface and flow in from the top surface of the crankcase 100 through an oil drain passage 110 before it is combined with the oil 250 passing through the outer end of the expansion chamber 220 and discharged into the bottom surface of the crankcase 100.

Therefore, the blow-by gas 230 may be recovered into the top surface of the crankcase 100 after the oil vapor 240 has been removed. As a result, the pressure inside the crankcase 100 may be lowered, and oil consumption may also be reduced at the same time.

By ventilating the engine crankcase as described above, the blow-by gas that flows from a combustion chamber into the internal space of the crankcase may be effectively discharged to prevent elevation of the internal pressure of the crankcase while improving efficiencies of an engine. Additionally, since the blow-by gas passage and the oil drain passage are interconnected, oil that has flown into the blow-by gas passage may be discharged into the oil drain passage. In addition, by forming an expansion chamber inside the crankcase that interconnects the blow-by gas passage with the oil drain passage, the oil contained in the blow-by gas may be separated and combined with the oil recovered, thereby, reducing oil consumption. Furthermore, by separating oil from the blow-by gas, generation of hazardous exhaust gas may be suppressed when blow-by gas is allowed to re-pass through an intake system and be supplied to a combustion chamber.

What is claimed is:

1. A crankcase of an internal combustion engine, comprising:
    a blow-by gas passage formed inside a crankcase and configured to discharge blow-by gas inside a crankcase to a top of the crankcase;
    an oil drain passage formed inside the crankcase that discharges oil collected from the top of a crankcase into the crankcase,
    wherein said blow-by gas passage and said oil drain passage are interconnected with each other inside the crankcase, and
    an expansion chamber formed between said blow-by gas passage and said oil drain passage in an area where said passages are interconnected;
    wherein said blow-by gas passage is formed so as to pass through a certain section of said expansion chamber;
    said oil drain passage is formed so as to pass by an end of said expansion chamber that is located in a flow direction of said blow-by gas; and
    said expansion chamber is formed so as to establish a downward slope in the flow direction of said blow-by gas.

2. The crankcase according to claim 1, wherein the internal combustion engine is a V-type engine that includes multiple cylinders and said blow-by gas passage and said oil drain passage are formed on one side of a cylinder bank of the V-type engine.

3. The crankcase according to claim 2, wherein said blow-by gas passage is formed further inside of a crankcase than said oil drain passage and said expansion chamber is extended substantially perpendicular to the cylinder axis of the cylinder bank.

4. A crankcase of an internal combustion engine, comprising:
    a blow-by gas passageway defined within the crankcase;
    at least one oil drainage passageway defined within the crankcase, wherein said blow-by gas passageway and said oil drainage passageway are interconnected; and
    an expansion chamber formed between the blow-by gas passageway and the at least one oil drain passageway;
    wherein the expansion chamber is configured and dimensioned to swirl blow-by gas entering therein such that liberation of oil particles in said gas is facilitated; and
    a downward directed lip formed at an entrance to the expansion chamber from the blow-by gas passage.

* * * * *